May 6, 1958     R. C. FISH     2,833,304
REGULATING CONTROL VALVES
Filed Aug. 24, 1954
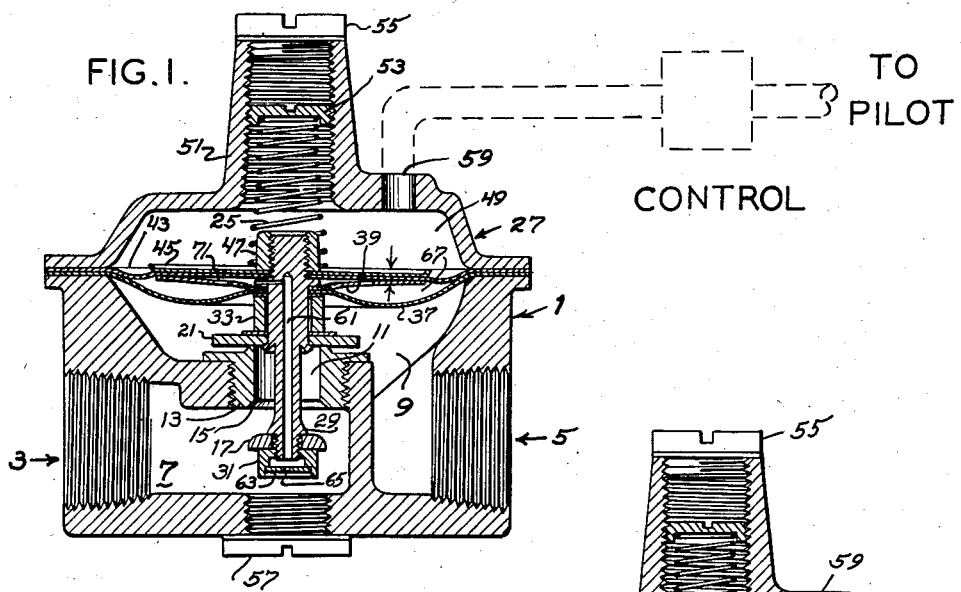
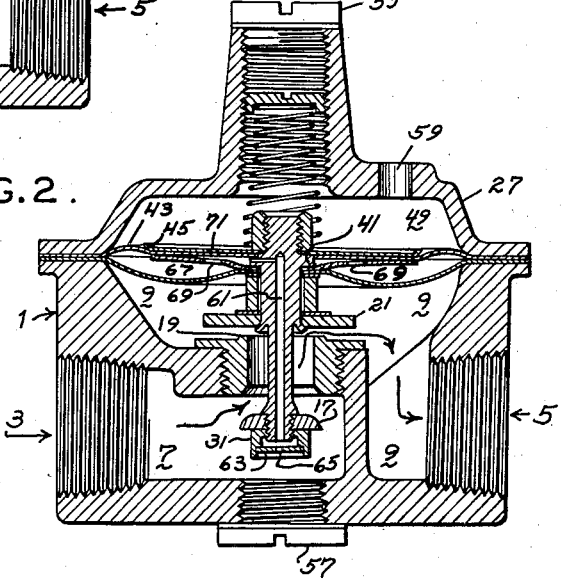
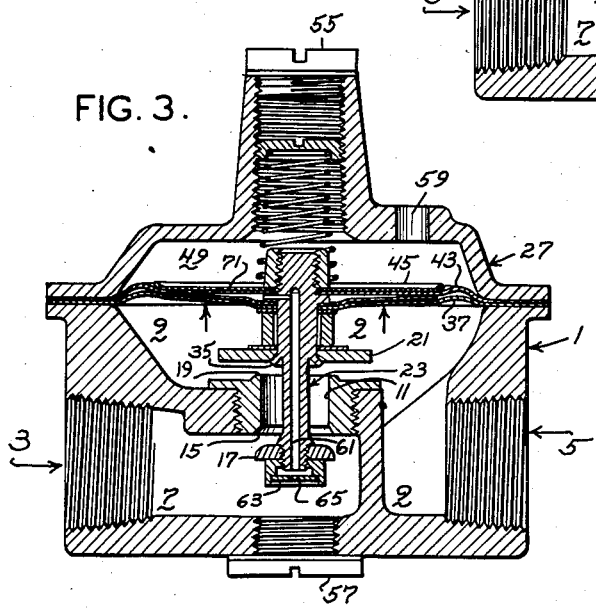
INVENTOR
ROBERT C. FISH,
BY Bruninga and Sutherland,
ATTORNEYS United States Patent Office 2,833,304
Patented May 6, 1958

2,833,304

REGULATING CONTROL VALVES

Robert C. Fish, Brentwood, Mo., assignor to Richard L. Persons, St. Louis County, Mo.

Application August 24, 1954, Serial No. 451,785

8 Claims. (Cl. 137—495)

This invention relates to valves, and more particularly to pressure-regulating automatic control valves such as might be employed to control flow of gas to furnaces, water heaters, clothes dryers and the like.

Heretofore, it has been customary to employ separate single-purpose valves in a gas line for such purposes as pressure regulation, burner on-off cycling and burner cut-off. Although attempts have been made to provide a multipurpose valve, the proposals involve an overly large, as well as complex, device with adverse operating characteristics.

Accordingly, it is an object of the invention to provide a valve unit having proper operating characteristics for both pressure regulations and on-off automatic control, these functions being achieved without increase in size and with little change in construction over what has been required for pressure regulation alone. Among the other objects of the invention may be noted the provision of a valve of the character described that is especially suited for gas heating and appliance installations; the provision of a compact valve of this type that can be readily manufactured using conventional parts; the provision of a valve that opens quickly, thereby to prevent flash-back at the main burner; the provision of a valve such as disclosed wherein pressure regulation is achieved immediately after opening, thereby to prevent a transient condition of excessive or starved flow as the pressure-regulating portions of the valve assume control; and the provision in a valve of a pair of coextensive diaphragms, the space between which is bled to permit first one and then the other of the diaphragms to assume operational control.

Briefly, the housing of the valve is formed with the usual inlet and outlet, which communicate with one another about a poppet and a reducing head. The two valve heads are spring biased as a unit in a direction to close the poppet and open the reducing head, movement in the reverse direction being effected by a pair of diaphragms. A first diaphragm is mounted with one face thereof exposed in the outlet chamber so as to be responsive to outlet pressure. This diaphragm operates against the bias of the spring to achieve pressure regulation and also to insure rapid opening of the poppet. A second diaphragm is disposed with one face thereof forming part of a control chamber or second space which is vented to a pilot control. The pilot control would normally include a low-capacity secondary valve, which might be actuated by a thermostat or solenoid. The other face of the second diaphragm forms part of a control or first space which is bled through orifices of the same size to the inlet and the control chamber. When the vent is closed, both faces of the second diaphragm are subjected to equivalent pressure, and the valve is closed by the bias of the regulating spring. When the control chamber is vented, the resulting pressure differential causes the poppet to be lifted from its seat against the spring bias.

In achieving compactness, the poppet is disposed on the outlet side of the reducing head. The first diaphragm extends from a common valve stem across the outlet chamber, and the second diaphragm extends coextensively with the first diaphragm, but on the side thereof remote from the outlet. A bleeder passage extends through the valve stem from the inlet to the control space between the diaphragms, and there is an orifice opening through the second diaphragm into the vented control chamber on the other side of the second diaphragm. Pressure plates are then affixed to the valve stem to extend respectively on opposite sides of the second diaphragm.

Other features of the invention will be in part apparent from and in part pointed out in the following detail description taken in connection with the accompanying drawings, in which:

Fig. 1 is a cross-sectional view of a valve embodying the invention, parts being shown in their closed position;

Fig. 2 is a view similar to that of Fig. 1, but illustrating parts in an intermediate open or starting position; and Fig. 3 is a view similar to that of Fig. 1, but with the parts in position for pressure regulation.

A typical gas burner installation includes a thermostatically-responsive pilot unit, the purpose of which is to open the line to the burner in response to the needs for heat. Sometimes it is also desirable to provide for cutting off the main burner in response to outage of a pilot flame. In many gas systems, and especially those having modern, efficient but sensitive gas burners, it is also necessary to provide pressure regulation at the point of use. Necessarily, the control mechanism for accomplishing these several functions becomes somewhat expensive and space consuming when they are to be performed by separate single-purpose valve units in the main gas line, it being understood that space requirements and cost are of major importance in many present-day installations.

For these reasons, attempts have been made to provide a multipurpose valve for the main line, the device incorporating pressure-regulating means, as well as automatic valve actuating or cut-off means. The results have not been satisfactory, however. Among the difficulties have been that of achieving an adequate degree of compactness and of providing for fast opening of the line, inasmuch as a gradual opening is likely to result in flash-back at the main burner. Such flash-back is a condition wherein ignition takes place at the air-mixing jet rather than at the actual burner. While for various reasons it is desirable to mount the shut-off poppet and regulating valve heads on a common stem, this practice can also lead to difficulties. If the poppet opens quickly, the regulating head is likely to be driven to a point where the burner is temporarily starved and the flame perhaps extinguished by the action of the regulating head. On the other hand, it is obvious that the regulating action should take place as soon as possible after opening of the poppet.

Referring now to the drawings, there is shown a valve, the lower body or housing 1 of which has an inlet 3 and an outlet 5. The ports 3 and 5 communicate respectively with a lower inlet chamber 7 and an upper outlet chamber 9, and a passage 11 extends through an insert 13 between these chambers. The lower end of the insert forms a tapering seat 15 for a reducing head 17 depending into the inlet chamber 7, whereas the upper end of the insert constitutes the seat 19 for a normally-closed valve head or poppet 21, which is located in the outlet chamber 9. The valve heads 17 and 21 are mouthed to move as a unit on a common stem 23, which is biased downwardly by a coil spring 25 contained in an upper portion 27 of the housing.

The valve stem 23 is shaped with a lower shoulder 29, and the valve head 17 is a tapering pressure regulating element secured against this shoulder by a nut 31. The other head 21 is a disk-like poppet of a diameter somewhat larger than that of the seat 19, the poppet being secured against a shoulder-forming spacer sleeve 33 by a lip 35 swaged from the stem. The other end of the spacer sleeve 33 serves to secure a lower flexible diaphragm 37 and an overlying, relatively inflexible pressure plate 39 against a shoulder 41 on the valve stem. A second flexible diaphragm 43 and an overlying pressure plate 45 are secured against the other end of the shoulder 41 by a nut 47, but the plate 39 is somewhat conical. The diaphragms 37 and 43 are sealed with the housing by being peripherally clamped between the portions 1 and 27 thereof, which portions, it will be understood, are secured together, as by bolts (not shown).

The upper portion 27 of the housing forms a chamber 49 containing the regulating spring 25, which is seated over the nut 47 to project within an interiorly threaded well 51. The spring abuts against a screw 53, which is adjustable along the well to vary the spring force on the valve stem and thereby the regulated outlet pressure. The well is closed at its top by a cap 55, and a cap 57 at the bottom of the housing permits replacement of the valve head 17, access otherwise being had to the contained mechanism by removal of the top body portion 27.

The chamber 49 also has a control function, there being a vent 59 which may be connected to secondary or pilot control mechanism designated by the "control" box. For example, the basic valve might be used in a supply line of a gas heating appliance to control flow of gas to and regulate the gas pressure at the main burner. The vent control could then be a small temperature-sensitive or solenoid valve which opens the vent 59 when heat is required. Another application would be safety shutoff, wherein the secondary "control" operates to close the vent 59 in response to extinguishment or outage of the pilot, thereby to effect automatic shutdown of the main burner. The vent 59 otherwise opens to the pilot burner, so that discharge from the vent 59 will be safely burned. Such venting is not necessarily the sole supply for the pilot burner, however.

Gas is admitted to the control chamber or space 49 through a bleeder passage 61 in the valve stem 23. The inlet to this passage is covered with a plate 63 having a small orifice 65, the orifice plate being secured in the nut 31. The passage 61 opens at its other end into the control space 67 between the diaphragms 37 and 43. The lower diaphragm 37 is imperforate, but the lower disk 39 has openings 69, and both the upper diaphragm 43 and disk 45 have registered orifices at 71. For reasons that will be more apparent, the orifices 65 and 71 preferably are of the same size, the bleeder passage being of a somewhat larger cross section. It will also be noted that the lower diaphragm 37 is flexible downwardly over its entire area, whereas the upper diaphragm 43 is restrained or made relatively less flexible by the pressure plates 39 and 45, so that only the outer portion is freely flexible.

Operation is as follows. Gas flows from the inlet chamber 7 through the bleeder passage 61 into the space 67 between the diaphragms, and thence through the orifice at 71 to the control chamber 49. When the vent 59 is closed (as by apparatus designated by the "control" box), this flow continues until the pressure in the spaces 49 and 67 is the same as that at the inlet 3. The forces on the surfaces of the top diaphragm are thus neutralized. The valve stem 23 is driven downwardly, however, by the regulating spring 25, and to some extent by the pressure acting against the top surface of the lower diaphragm 37, hence the poppet 21 is in closing engagement with its seat 19. The effect of the lower diaphragm might be entirely limited, however, if desired, by extending a support inwardly from the housing beneath the lower diaphragm for engagement thereby when in its distended condition.

Flow through the valve is initiated by venting the control chamber 49 through the vent 59 and the "pilot control." As the pressure within the control chamber 49 decreases relative to that within the control space 67, the force on the bottom face of the upper diaphragm 43 overcomes the bias of the regulating spring 25, and the valve stem 23 is lifted to clear the poppet 21 from its seat 19. It will be noted that the rate at which the valve opens at the poppet 21 is determined by the ratio of gas escape through vent 59 to gas flow into the chamber 49 at the orifices 71. Accordingly, fast opening is readily obtained by limiting flow through the orifice at 71 to the minimum practical value while providing for substantially greater flow through the vent 59. The poppet should lift to or beyond its full open position as quickly as possible in order to avoid flash-back and ignition at the air mixing jet of the burner.

Whereas the pressure within the control space 67 also acts upon the lower diaphragm 37, and to that extent opposes opening, this force is substantially less than that acting upwardly. This is so because there is a pressure plate 45 over the upper diaphragm 43, but the lower diaphragm is comparatively unsupported at its lower face. When the valve stem moves upwardly, flexation of the lower diaphragm initially occurs over a limited area adjacent the stem. On the other hand, the upper diaphragm is held by the pressure plate 43 (except at the outer edge), and it accordingly has a greater effective area than diaphragm 39. In a sense, the lower diaphragm 39 serves as a member for sealing the control space 67 from the outlet chamber when the valve is closed while permitting the valve stem to move, thereby permitting a pressure to be built up on diaphragm 43, so that the valve can be opened. Once open, the diaphragm 39 functions to make the other diaphragm 43 and associated plates responsive to outlet pressure, so that pressure regulation is possible.

When gas enters the outlet chamber 9, pressure is applied to the bottom face of the lower diaphragm 37 so that it is forced upwardly into gradually increasing engagement with the conical pressure plate 39, and the gas within the control space 67 is expelled through the orifice at 71. The lower diaphragm then becomes effective in providing for regulation of the pressure at the outlet 5, the reducing head being drawn toward its seat 15 against the bias of the regulating spring 25. Even before pressure between the diaphragms has been bled off completely, however, pressure regulation begins to occur as the outlet chamber fills with full opening of the poppet. Such immediate regulating action is explained by the remaining gas cushion within space 67, the cushion serving as a temporary supporting medium for the lower diaphragm. Hence, the outlet pressure cannot rise excessively immediately after opening of the poppet.

The valve also functions to prevent the main burner from being temporarily starved after opening of the poppet, as by excessive upward movement of the reducing head. It will be understood that the spacing between the two valve heads 17 and 21 is sufficient to permit full opening of the poppet 21 without unduly restricting the opening at the reducing head. Accordingly, quick cracking of the poppet to its full open position results in a temporary reduction of pressure in the inlet chamber. This effect, in turn, prevents excessive pressure in the outlet chamber (which might tend to cause over correction at the reducing head), and it also results in rapid exhausting of the control space 67 (and reduction of pressure acting on the top diaphragm). The orifices 65 and 71 are of the same size, hence gas will not enter the control space 67 faster than it leaves, there bing no build up of pressure so long as the vent 59 remains open. Bleeding or exhausting of the space 67 results because gas enters the low-pressure region 49 faster than it enters the equal sized orifice 65, which is partially starved as a result of the pressure drop at the inlet.

From the foregoing description, it is apparent that those skilled in the art will understand the structure, function and mode of operation of the invention herein disclosed, and appreciate the advantages thereof. Although one embodiment has been disclosed in detail, it is to be understood that the invention is not limited thereto, but the drawings and description thereof are to be understood as being merely illustrative. It is to be realized that many modifications and variations will present themselves to those skilled in the art without departing from the spirit of this invention or the scope thereof as set forth in the appended claims.

Having thus described the invention, what is claimed and desired to be secured by Letters Patent is:

1. A gas valve comprising a housing formed with inlet and outlet chambers, means forming a valve seat therebetween, a poppet disposed in said outlet chamber for cooperation with said valve seat, spring means biasing said poppet against the valve seat to shut off the valve, a first diaphragm secured in sealing relationship to the housing and poppet adjacent the outlet chamber so as to be responsive to outlet pressure, a second diaphragm secured in sealing relationship to the housing and poppet adjacent the first diaphragm but on the side thereof opposite from said outlet chamber, said diaphragms being in part separable so as to define a first space therebetween, a second space defined on the other side of the second diaphragm by the housing, bleeder passage means formed to open from the inlet chamber into said first and second spaces, control valve means for exhausting the second space thereby to establish a pressure differential on opposite sides of the second diaphragm, and pressure plate means acting in cooperation with the diaphragms to increase the effective area of the second diaphragm relative to the first diaphragm in order to lift the poppet from its seat upon establishment of said pressure differential, pressure in the outlet chamber then acting upon the first diaphragm to further open the poppet.

2. A gas valve comprising first and second housing sections, the first section being formed with inlet and outlet chambers and a valve seat therebetween, a poppet mounted in the outlet chamber, spring means biasing the poppet against the valve seat, first and second diaphragms sandwiched between the first and second housing sections at their margins, said diaphragms being secured centrally to the poppet and being separable adjacent the poppet so as to form a first space, a second space being defined by the second housing section and the second diaphragm, a bleeder passage formed in the poppet so as to open into the inlet chamber, said bleeder passage being adapted to open into the first space between the diaphragms, said bleeder passage further being adapted to open into said second space, and control valve means for exhausting the second space thereby to establish a pressure differential on opposite sides of the second diaphragm, and pressure plate means acting in cooperation with the diaphragms to increase the effective area of the second diaphragm relative to the first diaphragm, thereby causing the poppet to lift off its seat upon exhausting of said second space.

3. A valve as set forth in claim 2, wherein a pressure plate is secured to the poppet over said second diaphragm, the first diaphragm being relatively flexible.

4. In a gas-regulator cut-off valve of the type having a housing formed with inlet and outlet passages and valve seats therebetween, a shut-off poppet and a reducing head cooperable with the valve seats, a valve stem carrying both the shut-off poppet and reducing head, and spring means biasing the poppet toward and the reducing head away from their respective seats; the improvement comprising a first diaphragm secured in sealing relationship to said valve stem and housing in position adjacent the outlet passage so as to be responsive to outlet pressure, whereby said first diaphragm and reducing head function as a pressure regulator, a second diaphragm secured in sealing relationship with the housing and valve stem adjacent said first diaphragm but on the side thereof opposite from that of the outlet passage, said two diaphragms being at least in part separable so as to define a first space therebetween, means defining a second space on the opposite side of said second diaphragm, bleeder means formed to open from the inlet passage into said first and second space, and control valve means for exhausting said second space, said bleeder means and control valve means being correlated so as to exhaust said second space at a relatively rapid rate in comparison with the first space and develop a pressure differential on opposite sides of the second diaphragm, and pressure plate means acting in cooperation with the diaphragms to increase the effective area of the second diaphragm relative to the first diaphragm, thereby to lift the poppet, the first diaphragm then being responsive to outlet pressure.

5. In a gas-regulator cut-off valve of the type having a housing formed with a lower inlet and an upper outlet chamber, valve seat means formed between said chambers, a shut-off poppet and reducing head mounted on a common valve stem and cooperable with said valve seat means, and means biasing the poppet and reducing head downwardly to shut off the poppet and open the reducing head; the improvement that comprises a lower diaphragm secured in sealing relationship to the housing and valve stem and extending across the outlet chamber so that the lower face thereof is responsive to outlet pressure, an upper diaphragm secured in sealing relationship to the housing and valve stem and being at least in part spaced above said lower diaphragm so as to define a first space therebetween, a second space being defined by the upper surface of said upper diaphragm and the housing, bleeder means opening into the inlet chamber and being adapted to open into said first space whereby the lower face of the upper diaphragm is responsive to inlet pressure, second bleeder means adapted to open from the inlet chamber into the second space above the upper diaphragm so that the upper face of the upper diaphragm is also responsive to inlet pressure, and control valve means for exhausting said second space, thereby to establish a pressure differential such that the pressure on the lower face of the upper diaphragm is greater than that on the upper face thereof, and pressure plate means acting in cooperation with the diaphragms to increase the effective area of the second diaphragm relative to the first diaphragm, thereby to lift the poppet upwardly, the lower face of the lower diaphragm then being responsive to the outlet pressure in order to achieve pressure regulation.

6. A combination gas-regulator cut-off valve comprising first and second housing sections, the first housing section being formed with inlet and outlet passages and with associated valve seats, a reducing head and poppet disposed in the first housing section for cooperation with the valve seats, a valve stem carrying both said poppet and said reducing head, a pair of overlying diaphragms sandwiched between said housing sections at their margins and otherwise being at least in part spaced from one another, both of said diaphragms being secured in sealing relationship to said valve stem, a bleeder passage formed in the valve to extend from the inlet passage to the space between said diaphragms and also to the space defined by said second housing section and the adjacent diaphragm, a pressure plate secured to the valve stem immediately over said second diaphragm which is adjacent the second housing section, said pressure plate acting to increase the effective area of the second diaphragm relative to the other diaphragm, thereby to lift the poppet upon establishment of a differential pressure upon opposite sides of the second diaphragm, and control means for exhausting said space defined by the second housing section and the adjacent upper diaphragm, thereby to create a pressure differential.

7. A combination gas-regulator cut-off valve comprising upper and lower housing sections, upper and lower diaphragms sandwiched between said housing sections, the lower housing section being formed with a lower inlet passage and upper outlet passage separated by an apertured wall, a lower reducing head and an upper poppet disposed on opposite sides of said wall for cooperation with the aperture therethrough, a valve stem carrying both the poppet and reducing head, both of said diaphragms being secured in sealing relationship to said valve stem above said poppet and being spaced at least in part adjacent said valve stem, a bleeder passage extending from the inlet chamber through the valve stem and being adapted to open into the space between the diaphragms, bleeding means also extending from the inlet chamber into the space defined between the upper diaphragm and the upper housing, a pressure plate secured to the valve stem immediately over said second diaphragm which is adjacent the second housing section, said pressure plate acting to increase the effective area of the second diaphragm relative to the other diaphragm, thereby to lift the poppet upon establishment of a differential pressure upon opposite sides of the second diaphragm, and control means for exhausting the space defined by the upper diaphragm and upper housing.

8. A valve as set forth in claim 7 further including a bleeder means extending from the space between said diaphragms to the space defined by the upper diaphragm and upper housing, which bleeder means is of relatively reduced size in comparison with the control means for exhausting the space above the upper diaphragm, thereby to establish a pressure differential on opposite sides of the upper diaphragm when the space above the upper diaphragm is initially exhausted.

References Cited in the file of this patent

UNITED STATES PATENTS

| | | |
|---|---|---|
| 231,214 | Curtis | Aug. 17, 1880 |
| 1,663,701 | Hedges | Mar. 27, 1928 |
| 2,192,630 | Beam | Mar. 5, 1940 |
| 2,746,471 | Cobb | May 22, 1956 |

FOREIGN PATENTS

| | | |
|---|---|---|
| 27,009 | Great Britain | Oct. 23, 1897 |